No. 12,814. REISSUED JUNE 16, 1908.

R. SCHULZ.

STEAM TURBINE.

APPLICATION FILED FEB. 13, 1908.

Witnesses.

Jesse N. Sutton

P. W. Sommers

Inventor.

Richard Schulz by Henry Orth Jr.

Atty.

UNITED STATES PATENT OFFICE.

RICHARD SCHULZ, OF BERLIN, GERMANY.

STEAM-TURBINE.

No. 12,814. Specification of Reissued Letters Patent. Reissued June 16, 1908.

Original No. 864,199, dated August 27, 1907, Serial No. 381,343. Application for reissue filed February 13, 1908. Serial No. 415,787.

*To all whom it may concern:*

Be it known that I, RICHARD SCHULZ, a subject of the German Emperor, residing at Berlin, N. W., Germany, have invented certain new and useful Improvements in Steam-Turbines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to steam turbines and an important object is to provide guide blade holders for impact steam turbines in which there are one or more chambers that the steam flows through in an axial direction.

Guide blade holders for steam turbines that form part of the turbine casing and project through openings in the same into the interior of the turbine are known. It is likewise old to mount the guide blade holders so as to be revoluble and it is admissible to cut away the casing where short guide blade holders are used in order to fix them in place. With the requirements demanded for the driving of ships, it is necessary to have recourse to long guide blade holders extending over three quarters and sometimes the whole of the periphery, so that it is preferable to mount the blades or holders independently of the casing. The longer guide blade holders must extend into the bottom half of the casing so that if it is desired to inspect or repair the guide blades which are in the bottom half of the casing the turbine shaft with all the moving parts must first be lifted out. By using the guide blade holder made in accordance with the present invention it is not necessary to remove the shaft and other moving parts.

According to the present invention the guide blade holder is arranged in a ring or a portion of a ring which is detachably connected to and which forms an extension of the guide rim or nozzle rim of a guide disk or partition revoluble around the shaft of the turbine.

In order that the invention may be clearly understood reference is made to the accompanying drawing in which are shown some forms of guide blade holders made in accordance with this invention, and in which—

Figure 1:
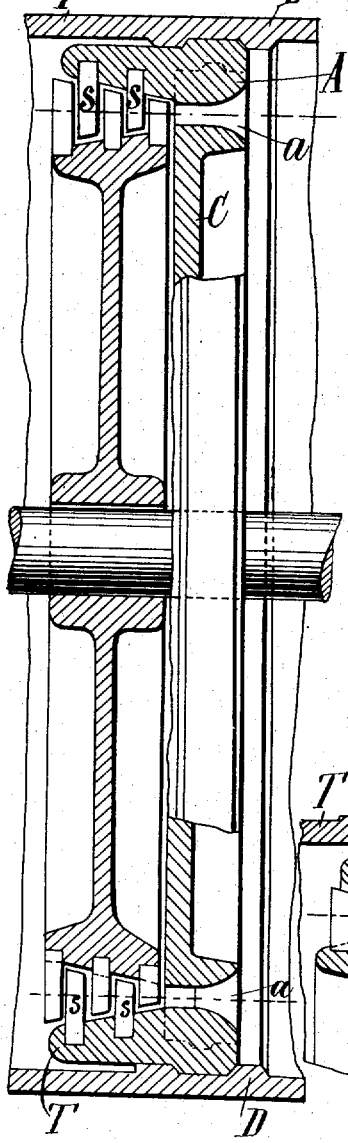
Figure 2:
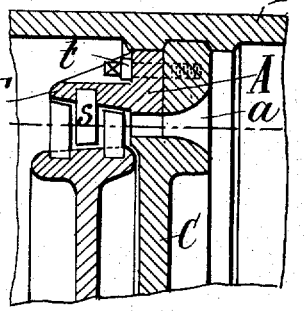
Figure 3:
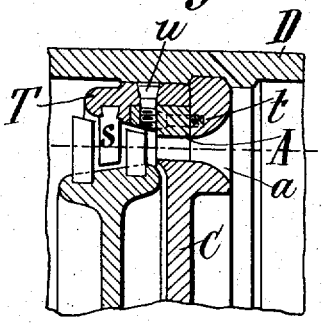
Figure 4:
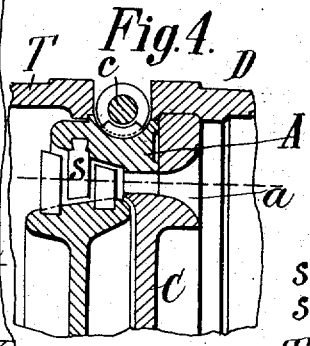
Figure 5:
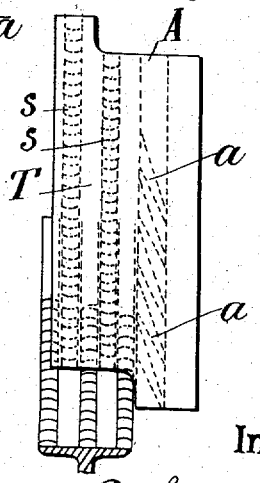

Figure 1 is a longitudinal axial section through a part of a turbine. Figs. 2 and 3 are sections through parts of the casing, guide apparatus or nozzles and the running wheel. Fig. 4 is a section of a guide blade holder formed as a regulating slide and containing the exhaust ends of the nozzles, and Fig. 5 is a plan of one form of guide blade holder.

In Fig. 1 the nozzles are formed in a rim of the partition or guide disk C that separates the several stages and in a ring A detachably surrounding the disk; said ring A forms an extension of the guide rim of the partition. The partition C is revolubly mounted with respect to the turbine shaft and casing.

The holder T for the stationary guide blades *s* is formed as flange or extension of the ring A and in one piece with it. If the nozzles *a* are distributed at different portions of the circumference of the disk or partition C, then radially divided arcuate portions or sectors of a ring A, each provided with the stationary blade holder T, are connected to the partition C.

In the form shown in Fig. 2 the ring or portion of the ring A is detachably attached by means of screws *t* to the nozzle rim on the partition or guide disk C, and the holder T for the stationary guide blades *s* projects laterally from the ring A.

In the form shown in Fig. 3 the ring A or portion of the ring containing the exhaust ends of the nozzles *a* is secured to the nozzle rim of the disk C by means of screws *t*, and the holder T for the stationary blades *s* is detachably secured to the ring A by bolts or screws *u*.

In the form shown in Fig. 4 the portion of a ring A that forms a supplemental extension of the guide rim of the guide disk C and contains the exhaust ends of the nozzles *a* is adjustable with respect to the guide disk or partition C, the holder T for the stationary blades *s* being adjustable with the ring portion A and being shown in this figure as made in one piece with A.

Any well known devices for adjusting the ring portion A may be used, and I have shown a worm *e* mounted on the casing and engaging worm teeth on the ring portion A which latter serves as a regulating slide for controlling the steam through the nozzles *a* to vary the expansion and impact of the steam, compare also Fig. 5 with respect to this. The guide blades in rigid connection with the exhaust ends of the nozzles and participating in the adjusting movement is a decided advantage. The guide blade holders can be made in one piece with or may be joined to the ring or portion of ring that forms a supplemental extension of the guide rim.

As special advantages of the present invention may be mentioned: that when the guide blades are connected to the nozzles or nozzle supports, they are independent of the casing of the turbine, and the interior of the casing is easier to finish. The casing retains its full strength, because large openings therethrough are not necessary. Special axial adjustment of the guide blade holders is not necessary. The arrangement also enables the guide disk portion with the guide blades, that are at the bottom of the casing of the turbine, to be brought above the shaft, after the upper half of the casing has been removed, by rotating the guide disk, so that the blades can be renovated.

I claim:

1. In a steam turbine of the type described, the combination with a revolubly mounted guide-disk having a guide-rim, of a guide blade holder attached to and forming an extension of said guide-rim.

2. In a steam turbine of the type described, the combination with a revolubly-mounted guide-disk having a guide-rim, of a guide blade holder detachably attached to and forming an extension of said guide-rim.

3. In a steam turbine of the type described, the combination with a revolubly-mounted guide-disk having a guide-rim, of a ring-shaped guide-blade holder attached to and forming an extension of said guide-rim.

4. In a steam turbine of the type described, the combination with a revolubly mounted guide-disk having a guide-rim, of a ring-shaped guide-blade holder detachably attached to and forming an extension of said guide-rim on said guide-disk, as set forth, for the purpose specified.

5. In a steam turbine of the type described, the combination with a revolubly mounted guide-disk having a guide-rim, of a portion of a ring attached to and forming an extension of said guide-rim, and a guide-blade holder attached to said portion of a ring, as set forth.

6. In a steam turbine of the type described, the combination with a revolubly mounted guide-disk having a guide-rim, of a portion of a ring attached to and forming an extension of said guide-rim, and a guide-blade holder detachably attached to said portion of a ring, for the purpose specified.

7. In a steam turbine of the type described, the combination with a revolubly-mounted guide-disk having a guide-rim; of a ring attached to and forming an extension of said guide-rim and a guide-blade holder attached to said ring, for the purpose specified.

8. In a steam turbine of the type described, the combination with a revolubly mounted guide-disk having a guide-rim, of a ring attached to and forming an extension of said guide-rim and a guide-blade holder detachably attached to said ring, for the purpose specified.

9. In a steam turbine of the type described, the combination with a revolubly mounted guide-disk having a guide-rim; of a slidable ring portion contacting and forming an extension of said guide-rim, a guide-blade holder on said ring portion and means for adjusting said ring portion with respect to said guide-rim, whereby when said ring portion is moved the holder participates in the movement.

10. In a steam turbine of the type described, the combination with a nozzle element; of a holder for the stationary guide-blades said holder containing the exhaust ends of the nozzles.

11. In a steam turbine of the type described, the combination with the nozzle element; of a holder for the stationary guide blades containing a portion of the nozzles and means to adjust the holder relatively to the nozzle element.

12. In a steam turbine of the type described, the combination with a shaft and casing, of a guide-disk or partition revolubly mounted with respect to the shaft and casing.

13. In a steam turbine of the type described, the combination with the casing and shaft, of a guide-disk or partition revolubly mounted with respect to the casing and shaft and having a rim containing the nozzle and a holder for the stationary blades of the turbine connected to the rim.

14. In a steam turbine, the combination with the casing and shaft, of a guide-disk or partition revolubly mounted with respect to the shaft and casing and having a rim containing the nozzles, and a holder for stationary blades of the turbine detachably connected to the rim of the disk.

15. In a steam turbine, the combination with the casing and shaft; of a guide-disk or partition revolubly mounted with respect to the shaft and casing and having a rim containing the nozzles, and a holder for stationary blades of the turbine slidably connected to the rim of the disk.

In testimony that I claim the foregoing as my invention, I have signed my name in presence of two subscribing witnesses.

RICHARD SCHULZ.

Witnesses:

JOHANNES HEIN,
HENRY HASPER.